(12) United States Patent
Bradley

(10) Patent No.: US 9,450,462 B2
(45) Date of Patent: Sep. 20, 2016

(54) AXIAL FLUX MACHINE

(71) Applicant: GE Energy Power Conversion Technology Ltd., Rugby Warwickshire (GB)

(72) Inventor: Stuart Bradley, Lutterworth (GB)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 534 days.

(21) Appl. No.: 14/082,228

(22) Filed: Nov. 18, 2013

(65) Prior Publication Data

US 2014/0139069 A1    May 22, 2014

(30) Foreign Application Priority Data

Nov. 19, 2012   (EP) .................................... 12193155

(51) Int. Cl.

| H02K 1/18 | (2006.01) |
|---|---|
| H02K 1/12 | (2006.01) |
| H02K 1/27 | (2006.01) |
| H02K 21/02 | (2006.01) |
| H02K 37/08 | (2006.01) |
| H02K 21/24 | (2006.01) |

(52) U.S. Cl.
CPC ............ *H02K 1/2793* (2013.01); *H02K 1/182* (2013.01); *H02K 21/026* (2013.01); *H02K 37/08* (2013.01); *H02K 1/12* (2013.01); *H02K 21/24* (2013.01); *H02K 2201/03* (2013.01)

(58) Field of Classification Search
CPC .. H02K 1/2793; H02K 1/182; H02K 21/026; H02K 37/08; H02K 1/12; H02K 2201/03; H02K 21/24; H02K 37/125

USPC ................. 310/49.22, 49.32, 49.42, 154.05, 310/156.32, 254.1

See application file for complete search history.

(56) References Cited

U.S. PATENT DOCUMENTS

2013/0154423 A1*   6/2013   Hench ...................... H02K 1/27
                                                                 310/114

FOREIGN PATENT DOCUMENTS

EP           2369720 A1       9/2011

OTHER PUBLICATIONS

EP Search Report issued in connection with corresponding EP Patent Application No. 12193155.4 dated on Apr. 15, 2013.

* cited by examiner

*Primary Examiner* — Terrance Kenerly
*Assistant Examiner* — Alexander Singh
(74) *Attorney, Agent, or Firm* — GE Global Patent Operation; Catherine J. Toppin

(57) ABSTRACT

An axial flux machine comprising a rotor mounted about an axis of rotation and having two axial faces. A first stator ring is positioned on the rotor adjacent to a first axial face, to define an air gap, between the first stator ring and first axial face. The first stator ring is formed by stator ring segments, each having a radially inner and outer edge. A second stator ring is positioned on another side of the rotor, adjacent to the second axial face, to define an air gap between the second stator ring and second axial face. The second stator ring is, also, formed by stator ring segments, each having a radially inner and outer edge and corresponding to a first stator ring segment. The stator ring segments are deflectable in unison in response to axial deflection of the rotor, to maintain the air gaps, due to link elements.

15 Claims, 5 Drawing Sheets

AXIAL FLUX MACHINE

FIELD OF INVENTION

Embodiments of the present invention relate to an axial flux machine and, more particularly, a stator construction for an axial flux machine. The axial flux machine may be an axial flux motor which may operate as a gearless drive for a grinding mill such as an autogenous (AG) mill or a semi-autogenous (SAG) mill.

BACKGROUND TO THE INVENTION

Grinding mills are widely used in mineral processing applications and the most common types are the autogenous (AG) grinding mill in which the feed material itself acts as the grinding medium and the semi-autogenous (SAG) grinding mill in which supplementary grinding material, typically steel balls, is added to the feed material.

Grinding mills are often subjected to transient loads in the radial, axial and circumferential directions, particularly during start-up, if the material in the mill has settled and formed, what is commonly referred to as a 'frozen charge'.

Gearless mill drives can be implemented in the form of an axial flux machine comprising a rotor disk and an axially adjacent stator. Particular difficulties can, however, arise due to the aforementioned transient loads which cause axial deflections of the rotor disk and therefore affect the air gap between the rotor disk and the axially adjacent stator. Unwanted vibration, fatigue and transient event damage can all result from the transient loads.

There is, therefore, a need for an improved axial machine which overcomes the aforementioned difficulties and which can be used as a gearless drive for a rotating electrical machine, and in particular a gearless mill drive for a grinding mill.

BRIEF DESCRIPTION OF THE INVENTION

According to an embodiment of the present invention, there is provided an axial flux machine. The axial flux machine comprises a rotor mounted about an axis of rotation and having first and second axial faces; a first stator ring positioned on one side of the rotor adjacent to the first axial face of the rotor to define a first air gap between the first stator ring and the first axial face of the rotor, the first stator ring being formed by a plurality of circumferentially adjacent wedge-shaped first stator ring segments each having a radially inner edge and a radially outer edge; a second stator ring positioned on the other side of the rotor adjacent to the second axial face of the rotor to define a second air gap between the second stator ring and the second axial face of the rotor, the second stator ring being formed by a plurality of circumferentially adjacent wedge-shaped second stator ring segments each having a radially inner edge and a radially outer edge and being circumferentially aligned with a corresponding wedge-shaped first stator ring segment; wherein the first and second stator ring segments are deflectable in the axial direction in response to axial deflection of the rotor and a link element extends between the radially outer edge regions of each circumferentially aligned pair of first and second stator ring segments so that they deflect together in unison in the axial direction.

The axial flux machine, according to an embodiment of the present invention, compensates for local deflections and changes of axial position of the rotor. In an embodiment, when the axial flux machine is subjected to transient loads which cause axial deflection of the rotor, the magnetic forces acting between the rotor and the first and second stator rings cause the first and second stator rings to deflect axially. Because the axial deflection of each circumferentially aligned pair of first and second stator ring segments is coordinated by the link elements, the first and second stator rings deflect together in unison in the axial direction and follow the local deflections of the rotor, thereby maintaining the first and second air gaps.

When the axial flux machine, according to an embodiment of the present invention, is used as a gearless mill drive in a grinding mill, the structural arrangement is simplified significantly, when compared to a more conventional radial flux gearless mill drive in the form of a ring motor, in which the mill barrel acts as the rotor and a stator circumferentially surrounds the rotor. This leads to a more robust but lightweight machine. In an embodiment, the first and second stator support rings are of significantly lighter construction than the equivalent component of a radial flux gearless mill drive, since the torque forces can be transferred to ground at a much smaller diameter. In addition, the stress reduction provided by the present arrangement means that although the pre-load (or dc) forces are the same as a radial flux gearless mill drive, the alternating loads are much lower because the restraining spring stiffness is low.

The rotor may comprise a rotor disk.

Each link element may extend substantially axially between the radially outer edge regions of each circumferentially aligned pair of first and second stator ring segments. This provides for effective force transfer between the first and second stator ring segments and ensures that they deflect in unison in the axial direction in response to local axial deflections of the rotor.

Two of said link elements may extend substantially axially between the radially outer edge regions of each circumferentially aligned pair of first and second stator ring segments. Each link element may extend substantially axially between circumferentially outermost positions on the radially outer edge regions. The use of two link elements may enhance the deflection of the first and second stator ring segments in response to local axial deflections of the rotor.

Each link element may be pivotally connected at its opposite ends to the radially outer edge regions of each circumferentially aligned pair of first and second stator ring segments, in an embodiment about a pivot axis which is circumferentially tangential to the radially outer edge of the respective first or second stator ring segment. This may enhance the co-ordinate deflection of the first and second stator ring segments.

The axial flux machine may include first and second stator supports, in an embodiment in the form of stator support disks, which may be statically positioned on axially opposite sides of the rotor to support respectively the first and second stator rings. The stator supports can be of a relatively lightweight construction thereby simplifying the construction of the axial flux machine.

The first stator ring segments may be supported at or close to their radially inner edge on the first stator support, so that they are located between the first stator support and the first axial face of the rotor. The second stator ring segments may be supported at or close to their radially inner edge on the second stator support, so that they are located between the second stator support and the second axial face of the rotor.

Each of the first and second stator ring segments may be supported at or close to its radially inner edge for movement in the generally axial direction to mimic any local axial deflections of the rotor.

Each of the first and second stator ring segments may be supported at or close to its radially inner edge by a pair of circumferentially spaced support links The support links may be positioned at circumferentially outermost positions of each respective first or second stator ring segment. Such an arrangement, using a pair of circumferentially spaced support links, provides a structurally simple but at the same time effective way of deflectably mounting the first and second stator ring segments on the respective first and second stator supports.

In an embodiment, each support link may be a hinged support link which may be pivotally connected at one end at or close to the radially inner edge of the first or second stator ring segment and may be pivotally connected at the other end to an axially inner face of the respective first or second stator support. In an embodiment, each support link may comprise a plurality of link elements which are positioned at or close to the radially inner edge of the first or second stator ring segment to permit substantially axial movement of the first or second stator ring segments relative to the first or second stator support. In the latter arrangement, the link elements may take the form of a parallelogram linkage. The arrangement of link elements that is ultimately selected to support the radially inner edge of each first stator ring segment on the first stator support and to support the radially inner edge of each second stator ring segment on the second stator support can be adapted to suit the size of the axial flux machine, with multiple link elements being used to obtain the desired stator ring movement path.

A coupling element may extend between at least one of the first stator ring segments and the first stator support to transfer torque between the first stator ring and the first stator support. A coupling element may extend between at least one of the second stator ring segments and the second stator support to transfer torque between the second stator ring and the second stator support. One of said coupling elements may extend between each of the plurality of first stator ring segments and the first stator support and between each of the plurality of second stator ring segments and the second stator support. The use of a plurality of coupling elements may be useful to improve torque transfer and hence machine stability.

Each coupling element may extend in a substantially circumferential direction between the respective first stator ring segment and the first stator support and between the respective second stator ring segment and the second stator support. Each coupling element may be pivotally connected about radial and axial axes at one end at or close to the radially outer edge of the first or second stator ring segment and may be pivotally connected about radial and axial axes at the other end at or close to a radially outer edge of the of the respective first or second stator support. Such multi-axis mounting, in an embodiment provided by a universal joint, ensures that the first and second stator ring segments can deflect independently relative to the respective first and second stator supports in the axial and radial directions in response to transient loads and thereby follow the local axial deflections of the rotor.

The first stator support may include a support arm which may project axially from a position at or close to its radially outer edge towards the radially outer edge of the axially adjacent first stator ring, said other end of the coupling element being pivotally connected about radial and axial axes to the support arm. The second stator support may include a support arm which may project axially from a position at or close to its radially outer edge towards the radially outer edge of the axially adjacent second stator ring, said other end of the coupling element being pivotally connected about radial and axial axes to the support arm. The provision of support arms ensures that the coupling elements can be arranged to extend in the substantially circumferential direction to thereby maximise torque transfer.

DETAILED DESCRIPTION OF THE INVENTION

Figure 1:
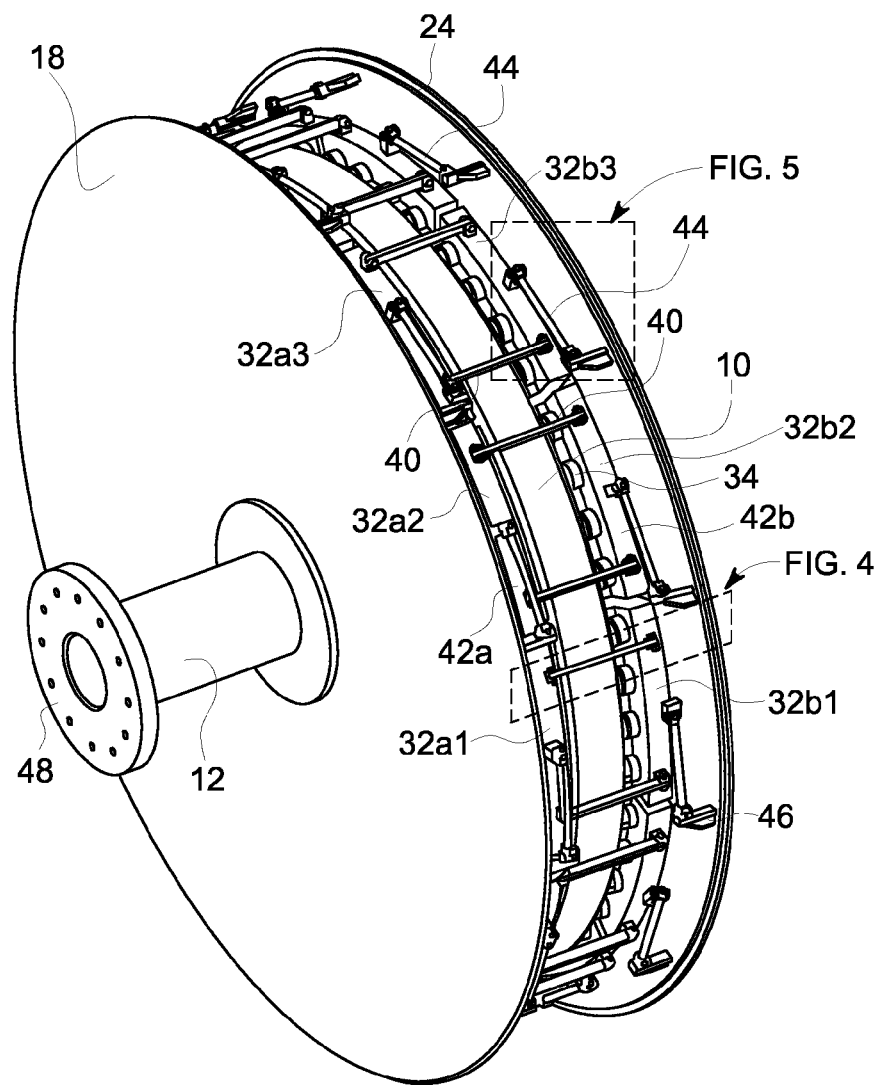
FIGS. 1 and 2 are diagrammatic perspective views of an axial flux machine according to the present invention.

Embodiments will now be described by way of example only and with reference to the accompanying drawings.

An axial flux machine comprises a rotor disk 10 mounted on a shaft 12 for rotation with the shaft 12 about its axis of rotation. The rotor disk 10 has first and second axial faces 14, 16 on which circumferentially arranged permanent magnets 17 are mounted towards its outer periphery.

A first stator support disk 18 is mounted on one side of the rotor disk 10 adjacent to the first axial face 14 and a first stator ring 20 is mounted on an axially inner face 22 of the first stator support disk 18 between the first stator support disk 18 and the first axial face 14 of the rotor disk 10. A second stator support disk 24 is mounted on the other side of the rotor disk 10 adjacent to the second axial face 16 and a second stator ring 26 is mounted on an axially inner face 28 of the second stator support disk 24 between the second stator support disk 24 and the second axial face 16 of the rotor disk 10. The first and second stator support disks 18, 26 are statically mounted with respect to the shaft 12 by bearings 30.

Each of the first and second stator rings 20, 26 is formed by a plurality of wedge-shaped respective first and second stator ring segments 32a, 32b each of which carries suitably arranged stator windings 34. A first air gap 8 is formed between the first stator ring 20 and the permanent magnets 17 on the first axial face 14 of the rotor disk 10. A second air gap 9 is formed between the second stator ring 26 and the permanent magnets 17 on the second axial face 16 of the rotor disk 10. The first and second stator ring segments 32a, 32b are aligned circumferentially to form pairs of first and second stator ring segments 32aN, 32bN, where N =1 to n; for example circumferentially aligned pairs 32a1, 32b1; 32a2, 32b2; 32a3, 32b3; etc.

Figure 2:
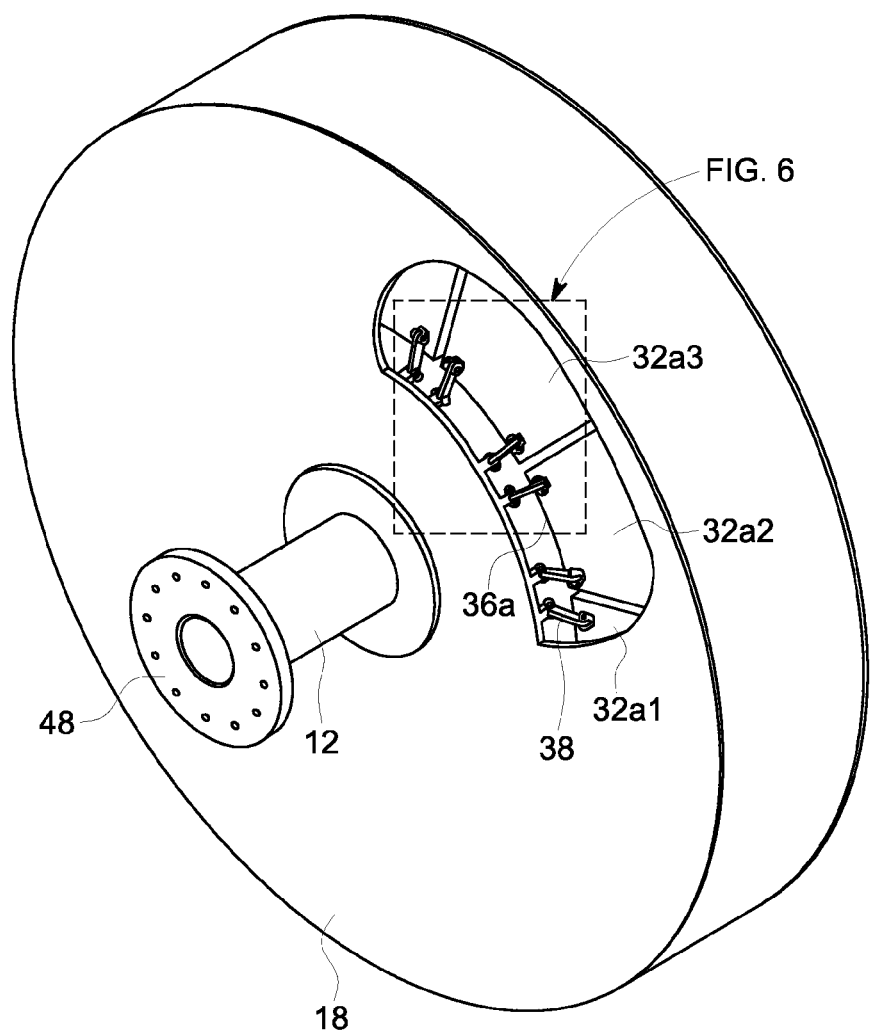
Figure 3:
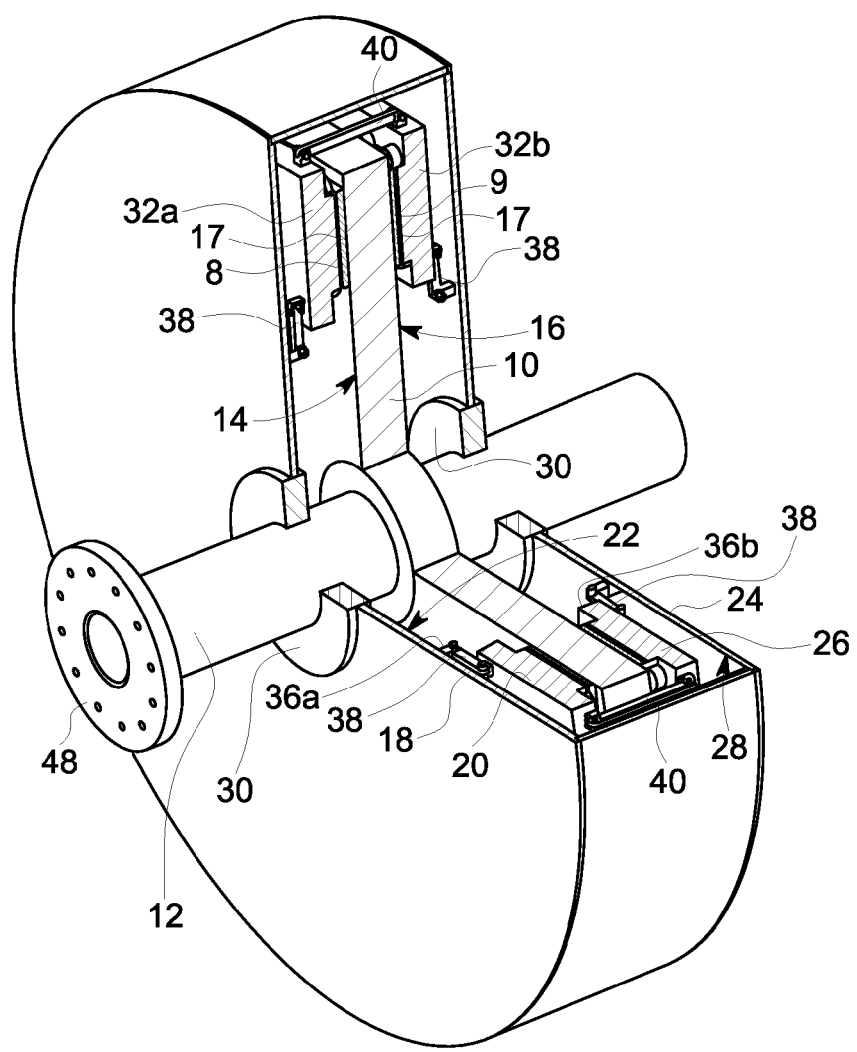
FIG. 3 is a partially cut-away perspective view of the machine shown in FIGS. 1 and 2.
Figure 6:
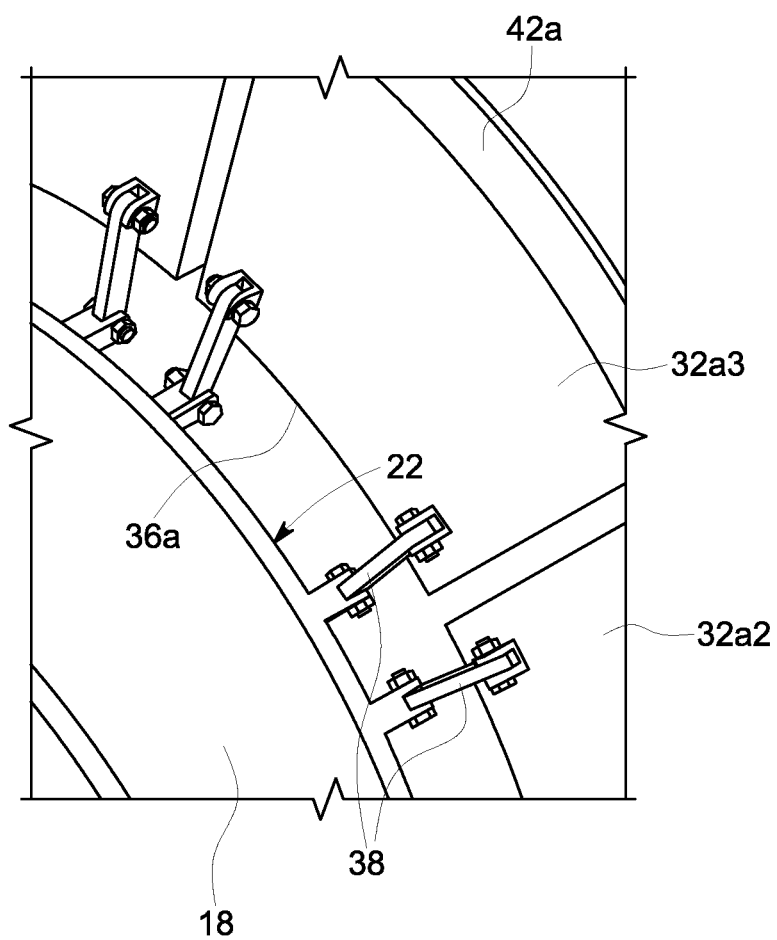
FIG. 6 is an enlarged view of the region labelled C in FIG. 2.

Referring to an embodiment illustrated in FIGS. 1, 2 and 6, each of the first stator ring segments 32a is pivotally supported at its radially inner edge 36a on the inner face 22 of the first stator support disk 18 by a hinged link arrangement comprising a pair of circumferentially spaced hinged support links 38 positioned at the circumferential extremities of each first stator ring segment 32a. The hinged support links 38 are pivotally connected at one end to the radially inner edge 36a of each first stator ring segment 32a and at the other end to the inner face 22 of the first stator support disk 18. Similarly, each of the second stator ring segments 32*b* is pivotally supported at its radially inner edge 36*b* on the inner face 28 of the second stator support disk 24 by a hinged link arrangement comprising a pair of circumferentially spaced hinged support links 38 positioned at the circumferential extremities of each second stator ring segment 32*b*. The hinged support links 38 are pivotally connected at one end to the radially inner edge 36*b* of each second stator ring segment 32*b* and at the other end to the inner face 28 of the second stator support disk 24. It will, thus, be understood that the first and second stator ring segments 32*a*, 32*b* are capable of pivotally deflecting in the substantially axial direction about their radially inner edges 36*a*, 36*b*. Each first stator ring segment 32*a* can deflect in the substantially axial direction about its radially inner edge 36*a* independently of the other first stator ring segments 32*a*. Each second stator ring segment 32*b* can likewise deflect in the substantially axial direction about its radially inner edge 36*b* independently of the other second stator ring segments 32*b*.

Figure 4:
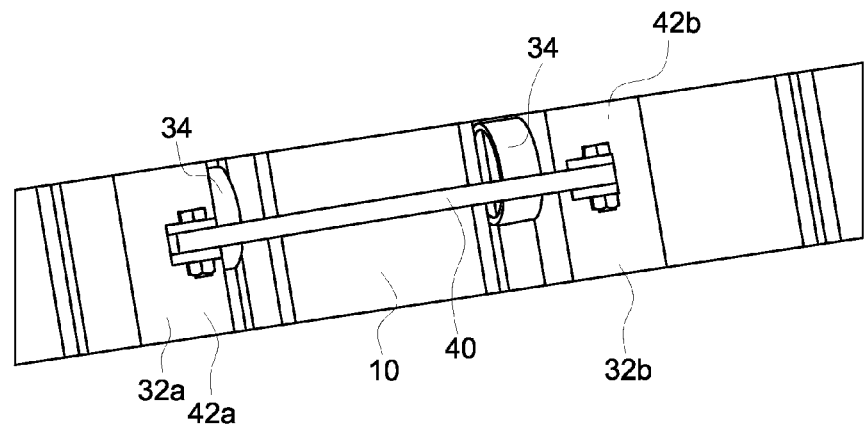
FIG. 4 is an enlarged view of the region labelled A in FIG. 1.

A rigid link element 40 extends axially between the radially outer edges 42*a*, 42*b* of each circumferentially aligned pair of first and second stator ring segments 32*a*N, 32*b*N. The link elements 40 coordinate any deflection in the axial direction of each pair of stator ring segments 32*a*N, 32*b*N so that they move together in unison in the axial direction. In an illustrated embodiment, two link elements 40 connect each pair of first and second stator ring segments 32*a*N, 32*b*N, with the link elements 40 being positioned at the circumferential extremities of each stator ring segment 32. As most clearly seen in FIG. 4, the opposite end of each link element 40 is pivotally connected to the radially outer edge 42*a*, 42*b* of the respective first or second stator ring segment 32*a*, 32*b* about a pivot axis which is circumferentially tangential to the radially outer edge 42*a*, 42*b* of the respective first or second stator ring segment 32*a*, 32*b*.

Figure 5:
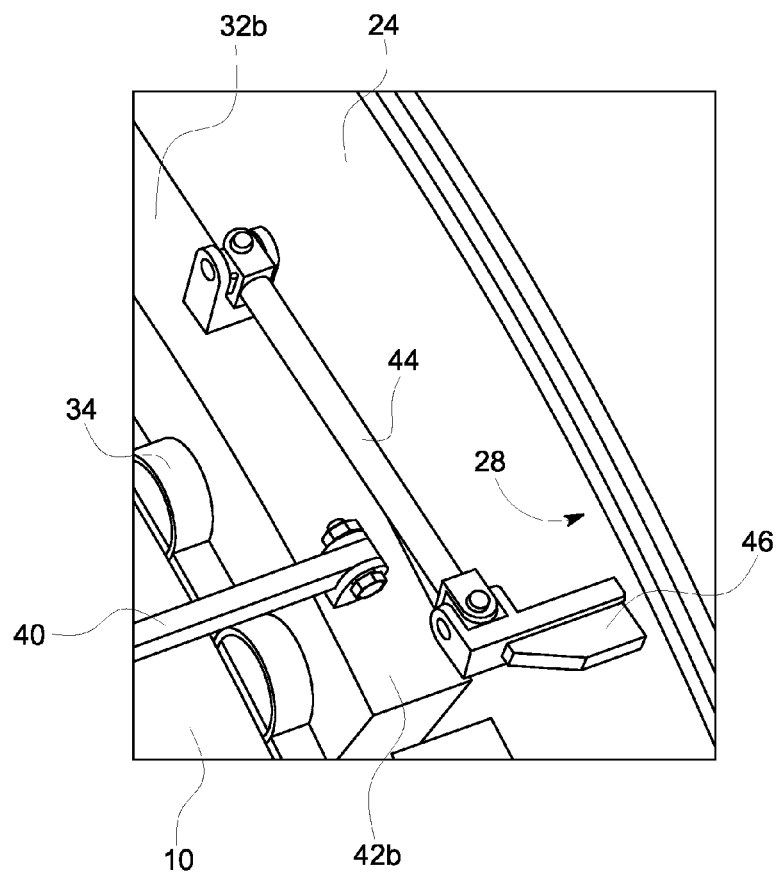
FIG. 5 is an enlarged view of the region labelled B in FIG. 1.

Referring to an embodiment illustrated in FIGS. 1 and 5, in order to transfer torque between the first and second stator rings 20, 26 and the respective first and second stator support disks 18, 24, a coupling element 44 connects each of the first stator ring segments 32*a* to the first stator support disk 18 and each of the second stator ring segments 32*b* to the second stator support disk 24. Each coupling element 44 extends in the substantially circumferential direction and is connected at one end to the radially outer edge 42*a*, 42*b* of each of the first and second stator ring segments 32*a*, 32*b* by a universal joint. The other end of each coupling element 44 is connected to a respective support arm 46, which projects axially from the inner face 22, 28 of each of the respective first and second stator support disks 18, 24, at a position adjacent to the radially outer edge, in a direction towards the rotor disk 10. Again, the pivotal connection is provided by a universal joint. The universal joints provide pivotal connections of the ends of each coupling element 44 about radial and axial axes, so that local axial and radial deflections of the individual first and second stator ring segments 32*a*, 32*b* can be accommodated.

During operation of the axial flux machine, in the event that the rotor disk 10 deflects axially, the magnetic forces cause a corresponding deflection of the first and second stator rings 20, 26. Because the stator rings 20, 26 are composed of individual first and second stator ring segments 32*a*, 32*b*, with the first stator ring segments 32*a* being able to deflect independently of each other, and the second stator ring segments 32*b* likewise being able to deflect independently of each other, the first and second stator rings 20, 26 are individually guided in the axial direction to follow the local axial deflections of the rotor disk 10. Moreover, the link elements 40 ensure that any local axial deflections of the circumferentially arranged pairs of first and second stator ring segments 32*a*N, 32*b*N are coordinated so that they move in unison in the axial direction. This arrangement ensures that the first and second air gaps 8, 9 are maintained during transient loading of the axial flux machine.

The axial flux machine is particularly suitable for operation as a motor or generator in any large diameter rotating machine. As indicated above, the axial flux machine could usefully operate as a gearless drive for a grinding mill. It could also be implemented as a generator in a wind turbine. In the illustrated embodiment, the shaft 12 includes a connecting flange 48 via which it may be connected to a component to be driven by the rotor disk 10 (possibly a mill barrel in the case of a grinding mill) or that drives the rotor disk 10.

Although embodiments have been described in the preceding paragraphs, it should be understood that various modifications may be made to those embodiments without departing from the scope of the appended claims. Thus, the breadth and scope of the claims should not be limited to the above-described embodiments. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural element with insubstantial differences from the literal languages of the claims.

What is claimed is:

1. An axial flux machine comprising:
    a rotor mounted about an axis of rotation and comprising a first axial face and a second axial face;
    a first stator ring positioned on one side of the rotor adjacent to the first axial face of the rotor to define a first air gap between the first stator ring and the first axial face of the rotor, the first stator ring being formed by a plurality of circumferentially adjacent wedge-shaped first stator ring segments each comprising a radially inner edge and a radially outer edge region;
    a second stator ring positioned on another side of the rotor adjacent to the second axial face of the rotor to define a second air gap between the second stator ring and the second axial face of the rotor, the second stator ring being formed by a plurality of circumferentially adjacent wedge-shaped second stator ring segments each comprising a radially inner edge and a radially outer edge region, wherein each of the plurality of second stator ring segments is circumferentially aligned with a corresponding first stator ring segment of the plurality of first stator ring segments, wherein the plurality of first stator ring segments and the plurality of second stator ring segments are deflectable in the axial direction in response to axial deflection of the rotor; and a plurality of link elements, wherein at least one link element of the plurality of link elements extends between the radially outer edge regions of each of the circumferentially aligned pairs of first and second stator ring segments, wherein each of the circumferentially aligned pairs of first and second stator ring segments deflect together in unison in the axial direction.

2. The axial flux machine according to claim 1, wherein each of the at least one link element extends substantially axially between the radially outer edge regions of each of the circumferentially aligned pairs of first and second stator ring segments.

3. The axial flux machine according to claim 2, wherein at least two of the plurality of link elements extend substantially axially between the radially outer edge regions of each of the circumferentially aligned pairs of first and second stator ring segments, wherein each of the at least two link elements extending substantially axially between circumferentially outermost positions in the radially outer edge regions.

4. The axial flux machine according to claim 1, wherein each of the at least one link element is pivotally connected at opposite ends of the at least one link element to the radially outer edge regions of each of the circumferentially aligned pairs of first and second stator ring segments about a pivot axis which is circumferentially tangential to the radially outer edge region of the respective first stator ring segment or the respective second stator ring segment.

5. The axial flux machine according to claim 1, wherein first stator support and second stator support are statically positioned on axially opposite sides of the rotor to support respectively the first stator ring and the second stator ring.

6. The axial flux machine according to claim 5, wherein the plurality of first stator ring segments are supported at or close to their radially inner edge on the first stator support between the first stator support and the first axial face of the rotor, and the plurality of second stator ring segments are supported at or close to their radially inner edge on the second stator support between the second stator support and the second axial face of the rotor.

7. The axial flux machine according to claim 6, wherein each of the plurality of first stator ring segments and the plurality of second stator ring segments is supported at or close to its radially inner edge by a pair of circumferentially spaced support links.

8. The axial flux machine according to claim 7, wherein the support links are positioned at circumferentially outermost positions of each respective first stator ring segment or respective second stator ring segment.

9. The axial flux machine according to claim 7, wherein each of the plurality of first stator ring segments and the plurality of second stator ring segments is pivotally supported at or close to its radially inner edge by a hinged support link for pivotal movement in the generally axial direction to mimic axial deflection of the rotor.

10. The axial flux machine according to claim 9, wherein each of the hinged support links is pivotally connected at one end at or close to the radially inner edge of the respective first stator ring segment or the respective second stator ring segment, and at another end to an axially inner face of the respective first stator support or the respective second stator support.

11. The axial flux machine according to claim 9, wherein a first coupling element extends between at least one of the plurality of first stator ring segments and the first stator support to transfer torque between the first stator ring and the first stator support, and a second coupling element extends between at least one of the plurality of second stator ring segments and the second stator support to transfer torque between the second stator ring and the second stator support.

12. The axial flux machine according to claim 11, wherein each of the first coupling element and the second coupling element extends in a substantially circumferential direction between the respective first stator ring segment and the first stator support and between the respective second stator ring segment and the second stator support.

13. The axial flux machine according to claim 12, wherein each of the first coupling element and the second coupling element is pivotally connected about radial and axial axes at one end at or close to the radially outer edge region of the respective first stator ring segment or the respective second stator ring segment, and is pivotally connected about radial and axial axes at another end at or close to a radially outer edge of the respective first stator support or the respective second stator support.

14. The axial flux machine according to claim 13, wherein the first stator support comprises a first support arm projecting axially from a position at or close to the radially outer edge of the first stator support towards the radially outer edge region of the axially adjacent first stator ring, the other end of the first coupling element being pivotally connected about radial and axial axes to the first support arm, and the second stator support comprises a second support arm projecting axially from a position at or close to the radially outer edge of the second stator support towards the radially outer edge of the axially adjacent second stator ring, the other end of the second coupling element being pivotally connected about radial and axial axes to the second support arm.

15. The axial flux machine according to claim 9, wherein a first coupling element extends between each of the plurality of first stator ring segments and the first stator support support to transfer torque between the first stator ring and the first stator support, and a second coupling element extends between each of the plurality of second stator ring segments and the second stator support to transfer torque between the second stator ring and the second stator support.

* * * * *